United States Patent
Miura et al.

(10) Patent No.: US 9,656,163 B2
(45) Date of Patent: May 23, 2017

(54) HAPTIC ENHANCEMENTS FOR EMULATED VIDEO GAME NOT ORIGINALLY DESIGNED WITH HAPTIC CAPABILITIES

(71) Applicant: Sony Computer Entertainment Inc., Tokyo (JP)

(72) Inventors: Victor Octav Suba Miura, Foster City, CA (US); Brian Michael Christopher Watson, Burlingame, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 13/791,434

(22) Filed: Mar. 8, 2013

(65) Prior Publication Data
US 2014/0004949 A1    Jan. 2, 2014

Related U.S. Application Data

(60) Provisional application No. 61/666,645, filed on Jun. 29, 2012.

(51) Int. Cl.
*A63F 9/24* (2006.01)
*A63F 13/00* (2014.01)
(Continued)

(52) U.S. Cl.
CPC .............. *A63F 13/28* (2014.09); *A63F 13/10* (2013.01); *A63F 13/12* (2013.01); *A63F 13/42* (2014.09);
(Continued)

(58) Field of Classification Search
CPC ............. G07F 17/3202; G07F 17/3223; G07F 17/3204
(Continued)

(56) References Cited

U.S. PATENT DOCUMENTS 6,009,458 A    12/1999  Hawkins et al.
6,402,620 B1   6/2002   Naghi
(Continued)

FOREIGN PATENT DOCUMENTS

EP    1172132 A    1/2002
EP    1225767 A    7/2002
(Continued)

OTHER PUBLICATIONS

Non-Final Office Action for U.S. Appl. No. 13/631,812, dated Mar. 28, 2014.
(Continued)

*Primary Examiner* — Milap Shah
*Assistant Examiner* — Jason Pinheiro
(74) *Attorney, Agent, or Firm* — Joshua D. Isenberg; JDI Patent

(57) ABSTRACT

Embodiments of the present invention describe the addition of a haptic response to legacy games that were not originally programmed to support haptics. The haptic capabilities may be added to the legacy game while it is being emulated by an emulator. The emulator is designed to generate a haptic stimulus that may be sent to the client device platform when a haptic trigger is present in the legacy game. The client device platform may then use the haptic stimulus to generate a haptic response. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

17 Claims, 5 Drawing Sheets

(51) Int. Cl.
*G06F 17/00* (2006.01)
*G06F 19/00* (2011.01)
*A63F 13/28* (2014.01)
*A63F 13/42* (2014.01)
*A63F 13/40* (2014.01)
*A63F 13/30* (2014.01)

(52) U.S. Cl.
CPC . *A63F 2300/302* (2013.01); *A63F 2300/6045* (2013.01)

(58) Field of Classification Search
USPC .................. 463/1–6, 30–33, 40–42
See application file for complete search history.

(56) References Cited

U.S. PATENT DOCUMENTS

| | | |
|---|---|---|
| 7,159,008 B1 | 1/2007 | Wies et al. |
| 7,286,132 B2 | 10/2007 | Kuhne |
| 7,470,196 B1 | 12/2008 | Joshi |
| 7,493,365 B2 | 2/2009 | Wies et al. |
| 8,321,571 B2 | 11/2012 | Crowder, Jr. et al. |
| 8,935,487 B2 | 1/2015 | Sengupta et al. |
| 9,248,374 B2 | 2/2016 | Watson et al. |
| 9,258,012 B2 | 2/2016 | Miura |
| 2002/0002510 A1 | 1/2002 | Sharp et al. |
| 2002/0045484 A1 | 4/2002 | Eck et al. |
| 2002/0065915 A1* | 5/2002 | Anderson et al. ............ 709/225 |
| 2003/0037030 A1 | 2/2003 | Dutta et al. |
| 2003/0190950 A1 | 10/2003 | Matsumoto |
| 2003/0225560 A1 | 12/2003 | Garcia et al. |
| 2004/0179019 A1 | 9/2004 | Sabella et al. |
| 2004/0224772 A1 | 11/2004 | Canessa et al. |
| 2004/0266529 A1 | 12/2004 | Chatani |
| 2005/0195187 A1 | 9/2005 | Seiler et al. |
| 2005/0288954 A1 | 12/2005 | McCarthy et al. |
| 2006/0009290 A1 | 1/2006 | Taho et al. |
| 2006/0080702 A1 | 4/2006 | Diez et al. |
| 2006/0117260 A1 | 6/2006 | Sloo et al. |
| 2006/0146057 A1 | 7/2006 | Blythe |
| 2006/0160626 A1 | 7/2006 | Gatto et al. |
| 2006/0259292 A1 | 11/2006 | Solomon et al. |
| 2007/0060361 A1 | 3/2007 | Nguyen et al. |
| 2007/0298866 A1 | 12/2007 | Gaudiano et al. |
| 2008/0032794 A1 | 2/2008 | Ware et al. |
| 2008/0113749 A1* | 5/2008 | Williams et al. ............... 463/20 |
| 2008/0282241 A1 | 11/2008 | Dong |
| 2008/0300053 A1 | 12/2008 | Muller |
| 2009/0082102 A1 | 3/2009 | Sargaison et al. |
| 2009/0088236 A1 | 4/2009 | Laude et al. |
| 2009/0098943 A1* | 4/2009 | Weber et al. ................... 463/42 |
| 2009/0162029 A1 | 6/2009 | Glen |
| 2009/0282139 A1 | 11/2009 | Mejdrich et al. |
| 2009/0303245 A1 | 12/2009 | Soupikov et al. |
| 2010/0088296 A1 | 4/2010 | Periyagaram et al. |
| 2010/0259536 A1 | 10/2010 | Toksvig et al. |
| 2011/0013699 A1 | 1/2011 | Persson |
| 2011/0098111 A1 | 4/2011 | Saito et al. |
| 2011/0218037 A1 | 9/2011 | Singh |
| 2011/0299105 A1 | 12/2011 | Morrison et al. |
| 2012/0021840 A1 | 1/2012 | Johnson et al. |
| 2012/0052930 A1 | 3/2012 | Mcgucken |
| 2012/0142425 A1 | 6/2012 | Scott et al. |
| 2012/0299940 A1 | 11/2012 | Dietrich, Jr. et al. |
| 2013/0137518 A1 | 5/2013 | Lucas |
| 2014/0004941 A1 | 1/2014 | Christopher Watson et al. |
| 2014/0004956 A1 | 1/2014 | Miura et al. |
| 2014/0004957 A1 | 1/2014 | Stine et al. |
| 2014/0004962 A1 | 1/2014 | Miura et al. |
| 2014/0066177 A1 | 3/2014 | Zalewski |
| 2014/0092087 A1 | 4/2014 | Kazama et al. |
| 2014/0094299 A1 | 4/2014 | Stine et al. |
| 2014/0094313 A1 | 4/2014 | Watson et al. |
| 2014/0094314 A1 | 4/2014 | Watson et al. |
| 2014/0094315 A1 | 4/2014 | Stine et al. |

FOREIGN PATENT DOCUMENTS

| | | |
|---|---|---|
| EP | 2039404 A2 | 3/2009 |
| EP | 2040163 A1 | 3/2009 |
| JP | 2012034793 A | 2/2012 |
| RU | 2364938 C2 | 8/2009 |
| WO | 2004024259 A | 3/2004 |

OTHER PUBLICATIONS

Non-Final Office Action for U.S. Appl. No. 13/790,311, dated Feb. 26, 2014.
Non-Final Office Action for U.S. Appl. No. 13/791,379, dated Mar. 27, 2014.
PCT International Search Report and Written Opinion for International Application No. PCT/US2013/061023, dated Jan. 23, 2014.
PCT International Search Report and Written Opinion for International Application No. PCT/US2013/061029, dated Jan. 23, 2014.
U.S. Appl. No. 13/631,725, entitled "Replay and Resumption Suspended Game" to Brian Michael Christopher Watson et al., filed Sep. 28, 2012.
U.S. Appl. No. 13/631,740, entitled "Method for Creating a Mini-Game" to Brian Michael Christopher Watson et al., filed Sep. 28, 2012.
U.S. Appl. No. 13/631,785, entitled "Pre-Loading Translated Code in Cloud Based Emulated Applications" to Jacob P. Stine et al., filed Sep. 28, 2012.
U.S. Appl. No. 13/631,803, entitled "Adaptive Load Balancing in Software Emulation of GPU Hardware", to Takayuki Kazama and Victor Octav Suba Miura , filed Sep. 28, 2012.
U.S. Appl. No. 13/631,812, entitled "Method and Apparatus for Improving Efficiency Wihout Increasing Latency in Emulation of a Legacy Application Title" to Jacob P. Stine et al., filed Sep. 28, 2012.
U.S. Appl. No. 13/790,311, entitled "Adding Triggers to Cloud-Based Emulated Games" to Victor Octav Suba Miura et al., filed Mar. 8, 2013.
U.S. Appl. No. 13/790,320, entitled "Determining Triggers for Cloud-Based Emulated Games" to Victor Octav Suba Miura et al., filed Mar. 8, 2013.
U.S. Appl. No. 13/791,379, entitled "Suspending State of Cloud-Based Legacy Application" to Jacob P. Stine et al., filed Mar. 8, 2013.
U.S. Appl. No. 13/791,420, entitled "Conversion of Haptic Events Into Screen Events" to Brian Michael Christopher Watson and Victor Octav Suba Miura , filed Mar. 8, 2013.
Provisional U.S. Appl. No. 61/666,665 to Brian Michael Christopher Watson et al., filed Jun. 29, 2012.
Provisional U.S. Appl. No. 61/666,628 to Victor Octav Suba Miura et al., filed Jun. 29, 2012.
Provisional U.S. Appl. No. 61/666,645 to Victor Octav Suba Miura et al., filed Jun. 29, 2012.
Provisional U.S. Appl. No. 61/666,679 to Jacob P. Stine et al., filed Jun. 29, 2012.
Co-Pending U.S. Appl. No. 61/694,718, to Gary M. Zalweski, filed Aug. 29, 2012.
Co-Pending U.S. Appl. No. 61/794,811, to Victor Octav Suba Miura, filed Mar. 15, 2013.
Final Office Action for U.S. Appl. No. 13/791,420, dated Jun. 11, 2014.
International Search Report and Written Opinion for International Application No. PCT/US2013/074813, dated May 29, 2014.
Non Final Office Action for U.S. Appl. No. 13/790,311 dated Jun. 27, 2013 6 pages.
Non-Final Office Action for U.S. Appl. No. 13/790,320, dated Jun. 18, 2014.
Non-Final Office Action for U.S. Appl. No. 13/792,664, dated Jun. 23, 2014.
Non-Final Office Action for U.S. Appl. No. 13/791,420, dated Mar. 27, 2014.
Final Office Action for U.S. Appl. No. 13/631,812, dated Aug. 29, 2014.

(56) References Cited

OTHER PUBLICATIONS

Non-Final Office Action for U.S. Appl. No. 13/631,725, dated Sep. 12, 2014.
Non-Final Office Action for U.S. Appl. No. 13/790,311, dated Sep. 9, 2014.
Non-Final Office Action for U.S. Appl. No. 13/631,785, dated Oct. 22, 2014.
Non-Final Office Action for U.S. Appl. No. 13/631,803, dated Oct. 14, 2014.
Non-Final Office Action for U.S. Appl. No. 13/791,379, dated Oct. 16, 2014.
Non-Final Office Action for U.S. Appl. No. 13/631,740, dated Oct. 21, 2014.
Final Office Action for U.S. Appl. No. 13/790,320, dated Jan. 15, 2015.
Final Office Action for U.S. Appl. No. 13/631,725, dated Dec. 19, 2014.
Final Office Action for U.S. Appl. No. 13/790,311, dated Mar. 27, 2015.
Final Office Action for U.S. Appl. No. 13/631,803, dated Apr. 16, 2015.
Grand Theft Auto: San Andreas Guide—Territories, https://www.youtube.com/watch?v=5d2GY-gr, May 29, 2012.
GTA San Andreas How to start a gang war, https://www.youtube.com/watch?v=9N4908kGtLO, Jan. 13, 2013.
Non-Final Office Action for U.S. Appl. No. 13/631,725, dated Mar. 16, 2015.
Non-Final Office Action for U.S. Appl. No. 13/631,740, dated Feb. 27, 2015.
Non-Final Office Action for U.S. Appl. No. 13/791,420, dated Apr. 9, 2015.
Non-Final Office Action for U.S. Appl. No. 14/183,351, dated May 11, 2015.
Playstation2, 2004, Grand Theft Auto—San Andreas.
Final Office Action for U.S. Appl. No. 13/791,379, dated May 13, 2015.
Non-Final Office Action for U.S. Appl. No. 13/790,320, dated Jul. 28, 2015.
Notice of Allowance for U.S. Appl. No. 13/631,803, dated Sep. 17, 2015.
Non-Final Office Action for U.S. Appl. No. 13/631,785, dated May 21, 2015.
Final Office Action for U.S. Appl. No. 13/631,785, dated Dec. 4, 2015.
Final Office Action for U.S. Appl. No. 13/791,420, dated Oct. 9, 2015.
Non-Final Office Action for U.S. Appl. No. 13/790,311, dated Nov. 19, 2015.
Notice of Allowance for U.S. Appl. No. 13/631,725, dated Oct. 6, 2015.
Notice of Allowance for U.S. Appl. No. 14/183,351, dated Oct. 5, 2015.
Final Office Action for U.S. Appl. No. 13/790,311, dated Jul. 15, 2016.
Non-Final Office Action for U.S. Appl. No. 13/631,812, dated Jun. 3, 2016.
Non-Final Office Action for U.S. Appl. No. 13/791,379, dated Jul. 1, 2016.
Non-Final Office Action for U.S. Appl. No. 15/019,891, dated May 6, 2016.
European Search Report and Written Opinion for European Application No. PCT/US2013/047856, dated Jul. 28, 2016.
U.S. Appl. No. 61/666,628, to Victor Octav Suba Miura, filed Jun. 29, 2012.
U.S. Appl. No. 61/666,645, to Victor Octav Suba Miura, filed Jun. 29, 2012.
U.S. Appl. No. 61/666,665, to Brian Michael Christopher Watson, filed Jun. 29, 2012.
U.S. Appl. No. 61/666,679, to Jacob P. Stine, filed Jun. 29, 2012.
Final Office Action for U.S. Appl. No. 13/631,740, dated Jul. 27, 2015.
Final Office Action for U.S. Appl. No. 13/631,803, dated Feb. 1, 2016.
Final Office Action for U.S. Appl. No. 13/790,320, dated Feb. 10, 2016.
Japanese Office Action for Japan Code Application No. 2015-517495, dated Feb. 9, 2016.
Non-Final Office Action for U.S. Appl. No. 13/631,803, dated Sep. 17, 2015.
Non-Final Office Action for U.S. Appl. No. 13/631,812, dated Jan. 18, 2017.
Notice of Allowance for U.S. Appl. No. 13/631,740, dated Mar. 16, 2017.
Notice of Allowance for U.S. Appl. No. 13/631,785, dated Feb. 27, 2017.
Notice of Allowance for U.S. Appl. No. 13/790,311, dated Mar. 30, 2017.
Notice of Allowance for U.S. Appl. No. 15/019,891, dated Jan. 26, 2017.

* cited by examiner

HAPTIC ENHANCEMENTS FOR EMULATED VIDEO GAME NOT ORIGINALLY DESIGNED WITH HAPTIC CAPABILITIES

CLAIM OF PRIORITY

This application is a non-provisional of U.S. provisional application No. 61/666,645, filed Jun. 29, 2012 the entire disclosures of which are incorporated herein by reference.

CROSS-REFERENCE TO RELATED APPLICATION

This application is related to commonly-assigned, U.S. provisional application No. 61/666,628, entitled "DETERMINING TRIGGERS FOR CLOUD-BASED EMULATED GAMES", filed Jun. 29, 2012, the entire disclosures of which are incorporated herein by reference.

This application is related to commonly-assigned, U.S. provisional application No. 61/666,665, entitled "CONVERSION OF HAPTIC EVENTS INTO SCREEN EVENTS", to Victor Suba Miura et al, filed Jun. 29, 2012, the entire disclosures of which are incorporated herein by reference.

This application is related to commonly-assigned, U.S. provisional application No. 61/666,679 entitled "SUSPENDING STATE OF CLOUD-BASED LEGACY APPLICATION", to Victor Suba Miura et al, filed the same day as the present application, the entire disclosures of which are incorporated herein by reference.

FIELD OF THE PRESENT DISCLOSURE

This disclosure relates to a method and apparatus for video game emulation. Among other things, this application describes a method and apparatus for emulating a video game that does not support haptics in a manner that introduces haptics in the emulated version.

BACKGROUND

Haptic feedback is a tactile feedback mechanism that utilizes the sense of touch. When used in conjunction with a control system the tactile feedback provides sensory cues to the user which indicates a certain event is happening to the object being controlled. For example, in an airplane simulation, visual indications of heavy turbulence may not be sufficient to alert the user to the conditions. However, by adding haptic feedback to a joystick controller in the form of vibrations, the user is more likely perceive the turbulence.

In a controller, an electrical stimulus activates an actuator which then provides mechanical motion to the controller. The mechanical motion is often vibratory. Early haptic feedback systems utilized electromagnetic technologies that moved a central mass with an applied magnetic field. Newer technologies such as electroactive polymers, piezoelectric, electrostatic and subsonic audio wave surface actuation can be used to create haptic feedback as well. These technologies allow for a more dynamic range of sensations to be produced.

In video games and simulators, haptic feedback has become a common addition to controllers. The haptic feedback capabilities in devices like Sony Computer Entertainment's Dual Shock family of controllers provide a more immersive gaming experience. However, each video game or simulator must have been programmed to provide the haptic stimulus to the controller in order to utilize the haptic feedback. Often legacy games designed for older gaming systems do not provide this haptic stimulus. Therefore, when legacy games are emulated so they can be played on more modern systems the emulated game will not have haptic feedback even though the controllers are capable of supporting this additional feature.

Presently, the legacy games must be redesigned by incorporating new code in order to provide the stimulus necessary for haptic feedback to be enabled. This is often not practical when designing an emulator to run the legacy game on a new system, due to the extensive time and resources that must be devoted to the task. Therefore, there is a need in the art to allow an emulator to add haptic feedback to legacy games and simulators without having to alter the code.

DETAILED DESCRIPTION

Figure 1:
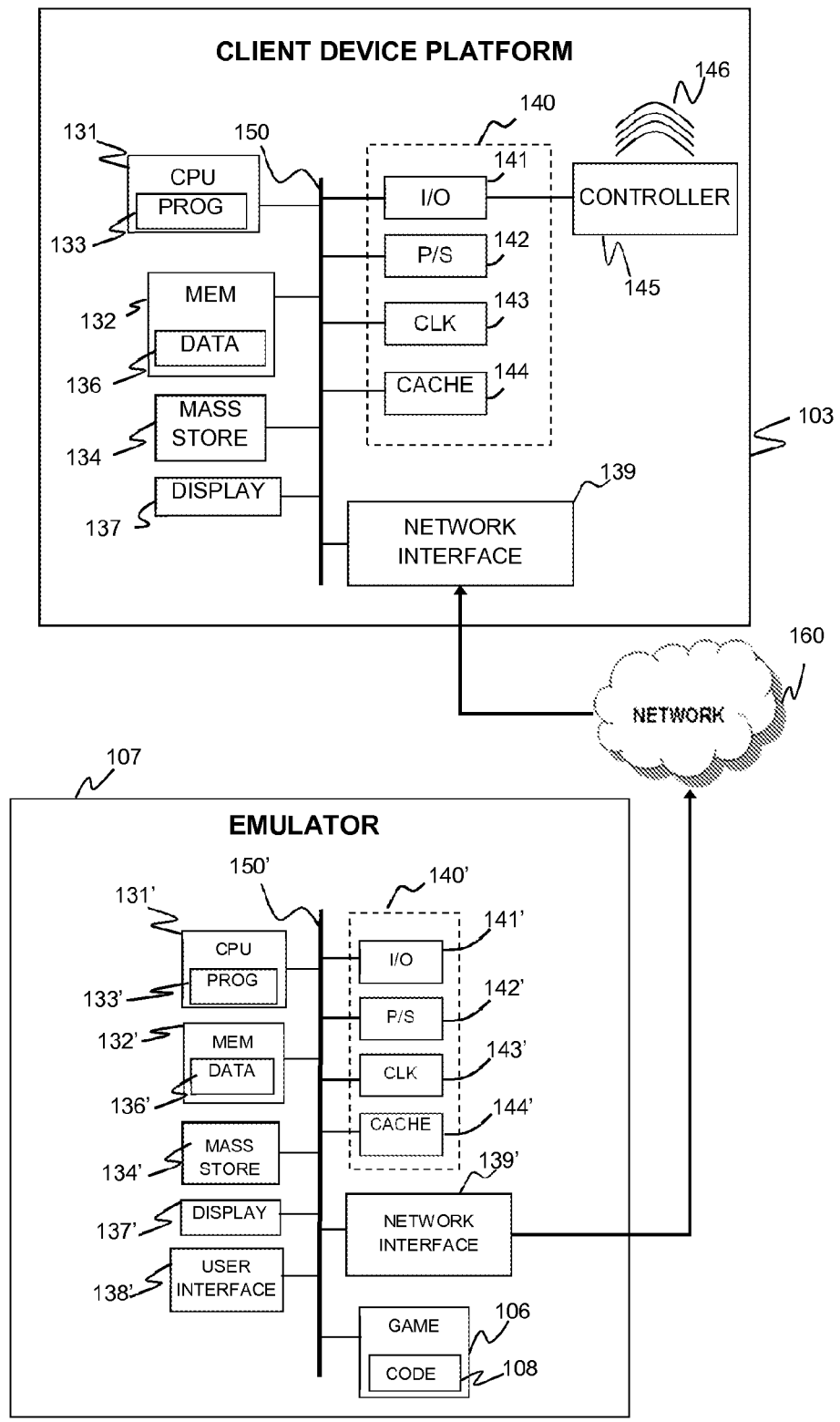
FIG. 1 is a schematic diagram of a client device platform and an emulator communicating over a network according to an aspect of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

According to various aspects of the present disclosure, haptic response capabilities may be added to legacy games that were not originally programmed to support haptics. The haptic capabilities may be added to the legacy game while it is being emulated by an emulator. The emulator is designed to generate a haptic stimulus that may be sent to the client device platform when a haptic trigger is present in the legacy game. The client device platform may then use the haptic stimulus to generate a haptic response.

Introduction

The process of emulating the functionality of a first computer platform (the "target system") on a second computer platform (the "host system") so that the host system can execute programs designed for the target system is known as "emulation." Emulation has commonly been achieved by creating software that converts program instructions designed for the target platform (target code instructions) into the native-language of a host platform (host instructions), thus achieving compatibility. More recently, emulation has also been realized through the creation of "virtual machines," in which the target platform's physical architecture—the design of the hardware itself—is replicated via a virtual model in software.

Two main types of emulation strategies currently are available in the emulation field. The first strategy is known as "interpretation", in which each target code instruction is decoded in turn as it is addressed, causing a small sequence of host instructions then to be executed that are semantically equivalent to the target code instruction. The main component of such an emulator is typically a software interpreter that converts each instruction of any program in the target machine language into a set of instructions in the host machine language, where the host machine language is the code language of the host computer on which the emulator is being used. In some instances, interpreters have been implemented in computer hardware or firmware, thereby enabling relatively fast execution of the emulated programs.

The other main emulation strategy is known as "translation", in which the target instructions are analyzed and decoded. This is also referred to as "recompilation" or "cross-compilation". It is well known that the execution speed of computer programs is often dramatically reduced by interpreters. It is not uncommon for a computer program to run ten to twenty times slower when it is executed via emulation than when the equivalent program is recompiled into target machine code and the target code version is executed. A number of products have successfully improved on the speed of executing source applications by translating portions of the target program at run time into host machine code, and then executing the recompiled program portions. While the translation process may take, e.g., 50 to 100 machine or clock cycles per instruction of the target code, the greater speed of the resulting host machine code is, on average, enough to improve the overall speed of execution of most source applications.

FIG. 1 is a schematic of an embodiment of the present invention. Emulator 107 may be accessed by a client device platform 103 over a network 160. Client device platform 103 may be one of a plurality of client device platforms 103 that are each able to access the same emulator 107 over the network 160. Client device platform 103 may also access alternative emulators 107.

Client device platform 103 may include a central processor unit (CPU) 131. By way of example, a CPU 131 may include one or more processors, which may be configured according to, e.g., a dual-core, quad-core, multi-core, or Cell processor architecture. The client device platform 103 may also include a memory 132 (e.g., RAM, DRAM, ROM, and the like). The CPU 131 may execute a process-control program 133, portions of which may be stored in the memory 132. The client device platform 103 may also include well-known support circuits 140, such as input/output (I/O) circuits 141, power supplies (P/S) 142, a clock (CLK) 143 and cache 144. The client device platform 103 may optionally include a mass storage device 134 such as a disk drive, CD-ROM drive, tape drive, or the like to store programs and/or data. The client device platform 103 may also optionally include a display unit 137. The display unit 137 may be in the form of a cathode ray tube (CRT) or flat panel screen that displays text, numerals, or graphical symbols. A controller 145 may be connected to the client device platform 103 through the I/O circuit 141 or it may be directly integrated into the client device platform 103. The controller 145 may facilitate interaction between the client device platform 103 and a user. The controller 145 may include a keyboard, mouse, joystick, light pen, hand-held controls or other device. The controller 145 is also capable of receiving a haptic stimulus 111 (not shown). In response to the haptic stimulus 111, the controller may generate a haptic response 146. By way of example and not by way of limitation, the haptic response 146 may be vibrations or any other feedback corresponding to the sense of touch. The client device platform 103 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The client device platform 103 may send and receive data and/or requests for files via one or more data packets over the network 160.

The preceding components may exchange signals with each other via an internal system bus 150. The client device platform 103 may be a general purpose computer that becomes a special purpose computer when miming code that implements embodiments of the present invention as described herein.

The emulator 107 may include a central processor unit (CPU) 131'. By way of example, a CPU 131' may include one or more multiple core processors, which may be configured according to, e.g., a dual-core, quad-core, multi-core, or Cell processor architecture. The emulator 107 may also include a memory 132' (e.g., RAM, DRAM, ROM, and the like). The CPU 131' may execute a process-control program 133', portions of which may be stored in the memory 132'. The emulator 107 may also include well-known support circuits 140', such as input/output (I/O) circuits 141', power supplies (P/S) 142', a clock (CLK) 143' and cache 144'. The emulator 107 may optionally include a mass storage device 134' such as a disk drive, CD-ROM drive, tape drive, or the like to store programs and/or data. The emulator 107 may also optionally include a display unit 137' and user interface unit 138' to facilitate interaction between the emulator 107 and a user who requires direct access to the emulator 107. The display unit 137' may be in the form of a cathode ray tube (CRT) or flat panel screen that displays text, numerals, or graphical symbols. The user interface unit 138' may include a keyboard, mouse, joystick, light pen, or other device. The emulator 107 may include a network interface 139', configured to enable the use of Wi-Fi, an Ethernet port, or other communication methods.

The network interface 139' may incorporate suitable hardware, software, firmware or some combination of two or more of these to facilitate communication via the electronic communications network 160. The network interface 139' may be configured to implement wired or wireless communication over local area networks and wide area networks such as the Internet. The emulator 107 may send and receive data and/or requests for files via one or more data packets over the network 160.

The preceding components may exchange signals with each other via an internal system bus 150'. The emulator 107 may be a general purpose computer that becomes a special purpose computer when running code that implements embodiments of the present invention as described herein.

Emulator 107 may access a legacy game 106 that has been selected by the client device platform 103 for emulation through the internal system bus 150'. There may be more than one legacy game 106 stored in the emulator. The legacy games may also be stored in the memory 132' or in the mass storage device 134'. Additionally, one or more legacy games 106 may be stored at a remote location accessible to the emulator 107 over the network 160. Each legacy game 106 contains game code 108. When the legacy game 106 is emulated, the game code 108 produces legacy game data 109 (not shown).

By way of example, a legacy game 106 may be any game that is not compatible with the client device platform 103. By way of example and not by way of limitation, the legacy game 106 may have been designed to be played on Sony Computer Entertainment's PlayStation console, but the client device platform 103 is a home computer. By way of example, the legacy game 106 may have been designed to be played on a PlayStation 2 console, but the client device platform 103 is a PlayStation 3 console. Further, by way of example and not by way of limitation, a legacy game 106 may have been designed to be played on a PlayStation console, but the client device platform 103 is a hand held console such as the PlayStation Vita from Sony Computer Entertainment. Alternatively, the client device platform may be a device other than a game console or portable game device, e.g., a personal computer, a smart phone, a tablet computer, or other similar device.

Figure 2:
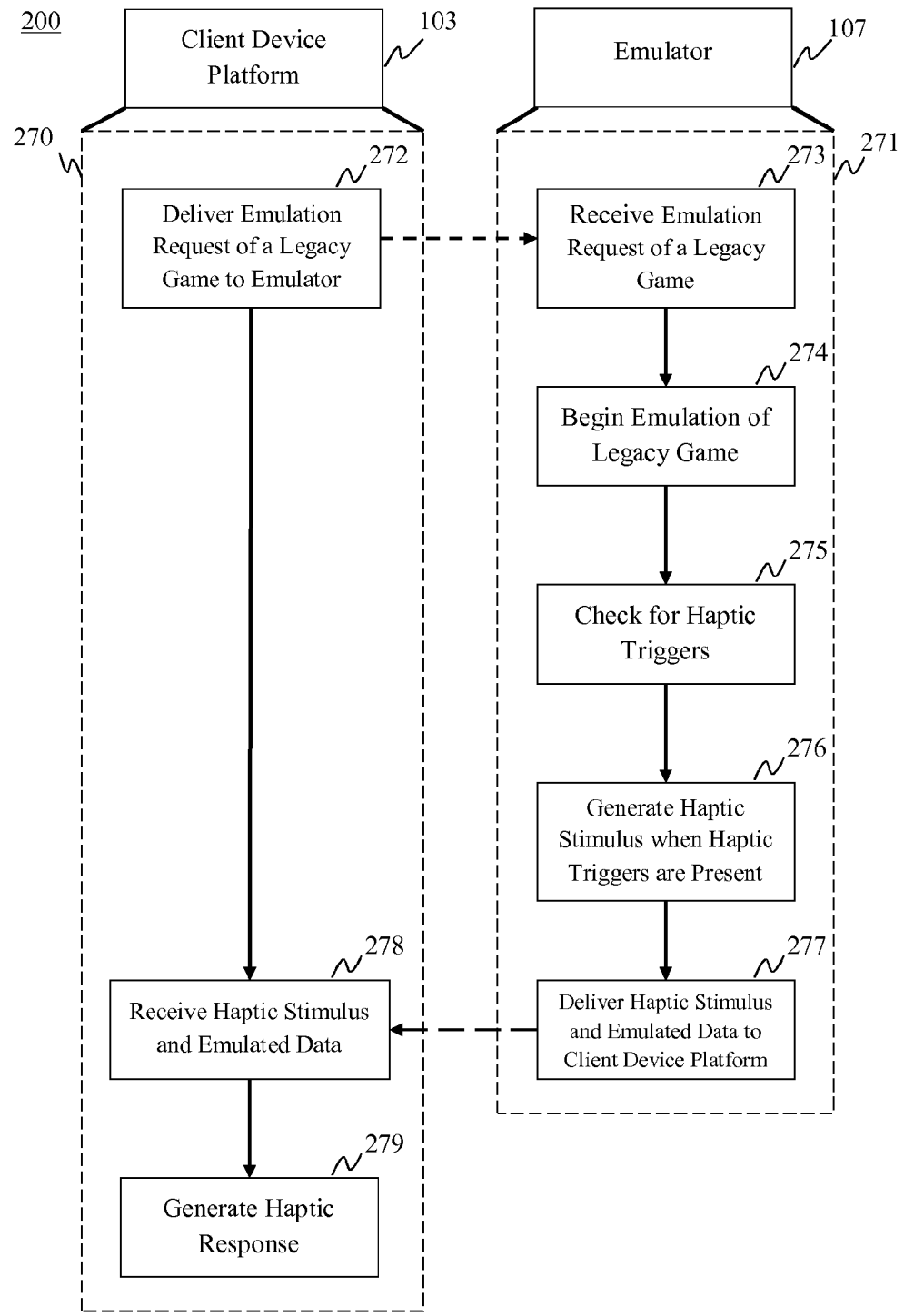
FIG. 2 is a flow diagram illustrating a method of adding haptics to an emulated game according to an aspect of the present disclosure.

As shown in FIG. 2, the client device platform 103 and the emulator 107 may be configured to implement a method for adding a haptic response 146 to a legacy game 106 that was not originally designed to produce haptic feedback according to an inventive method 200. Various aspects of the method 200 may be implemented by execution of computer executable instructions running on the client device platform 103 and/or the emulator 107. Specifically, a client device platform 103 may be configured, e.g., by suitable programming, to implement certain client device platform instructions 270. In addition, an emulator 107 may be configured to implement certain emulation instructions 271. In FIG. 2 the dashed arrows represent the flow of data between the client device platform 103 and the emulator 107 over the network 160.

Initially, at 272 the client device platform 103 may deliver information to the emulator 107 indicating that the user has selected a legacy game 106 that he wants emulated. The emulator 107 receives this information at block 273 and then proceeds to emulate the chosen legacy game 106 at 274. While emulating the legacy game 106, the emulator 107 will check the legacy game data 109 for haptic triggers 110 (not shown) at 275.

A haptic trigger 110 is a portion of legacy game data 109 that has been identified as corresponding to a haptic game event. As used herein, a haptic game event is an event in the legacy game 106 that warrants a haptic response 146. There are many different types of legacy game data 109 that can correspond to an event warranting a haptic response 146. By way of example, and not by way of limitation, legacy game data 109 arising from the generation of certain sounds, such as an explosion that occurs during the game, may be identified as a haptic trigger 110. The emulator 107 may determine that an explosion has occurred in the legacy game by identifying the portion of the legacy game data 109 which will generate the sound of an explosion from the sound card. However, it should be noted that haptic triggers 110 are not limited to sound events.

Alternatively a haptic trigger 110 may also be identified when a specified combination of conditions are met. By way example and not by way of limitation, a specified combination of conditions may be when, in a football game, there are only a few seconds remaining in the game and a user is trying to kick a game winning field goal. A haptic response 146, such as shaking the controller 145, may enable the user to feel the pressure of the situation in the game and produce a more realistic gaming experience. The emulator 107 may use screen scraping to find the time left on the clock, and the emulator 107 can detect that the legacy game 106 is accessing the play for kicking a field goal. Further, haptic triggers 110 may be any other event or combination of events that may be perceived by the emulator 107, and which do not require changing the internal code 108 of the legacy game 106. By way of example and without limitation these events may be sound card events, reading information from the disk, writing data to a memory card, or monitoring the memory contents of a legacy game 106 while the legacy game 106 is being emulated. The haptic triggers 110 described above are described in greater detail in the commonly assigned related patent application entitled "DETERMINING TRIGGERS FOR CLOUD-BASED EMULATED GAMES" 61/666,628 which has been incorporated herein in its entirety.

When the emulator 107 identifies a haptic trigger 110, it proceeds to 276 and generates a haptic stimulus 111. At 277, both the emulated legacy game data 109 and the haptic stimulus 111 are sent to the client device platform 103. The client device platform 103 receives the haptic stimulus 111 and the emulated data at 278, and then utilizes the haptic stimulus 111 to produce a haptic response 146 at 279.

Figure 3A:
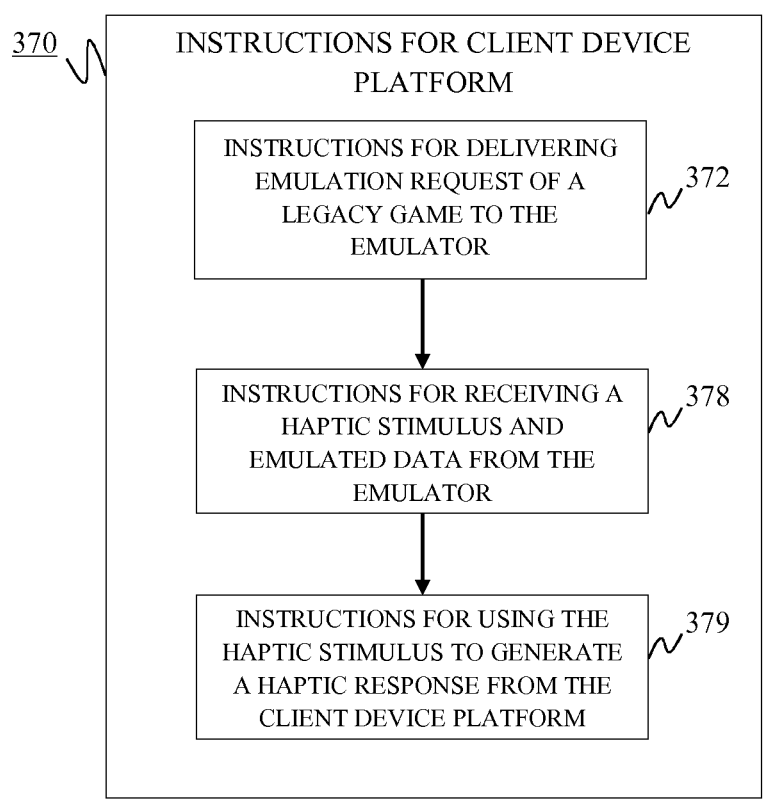
FIG. 3A is a block diagram describing the instructions for how a client device platform adds haptics to an emulated game according to an aspect of the present disclosure.

As shown in FIG. 3A, a set of client device platform instructions 370 may be implemented, e.g., by the client device platform 103. The client device platform instructions 370 may be formed on a nontransitory computer readable medium such as the memory 132 or the mass storage device 134. The client device platform instructions 370 may also be part of the process control program 133. The instructions include delivering the title of a selected legacy game 106 to the emulator 107 at 372. Thereafter, the client emulation instructions 370 require the client's haptic software to receive the haptic stimulus 111 and the emulated legacy game data 109 from the emulator at 378. Once the haptic stimulus 111 is received, the client device platform 103 is instructed to use the stimulus 111 to illicit a haptic response 146 from the client device platform 103 at 379.

Figure 3B:
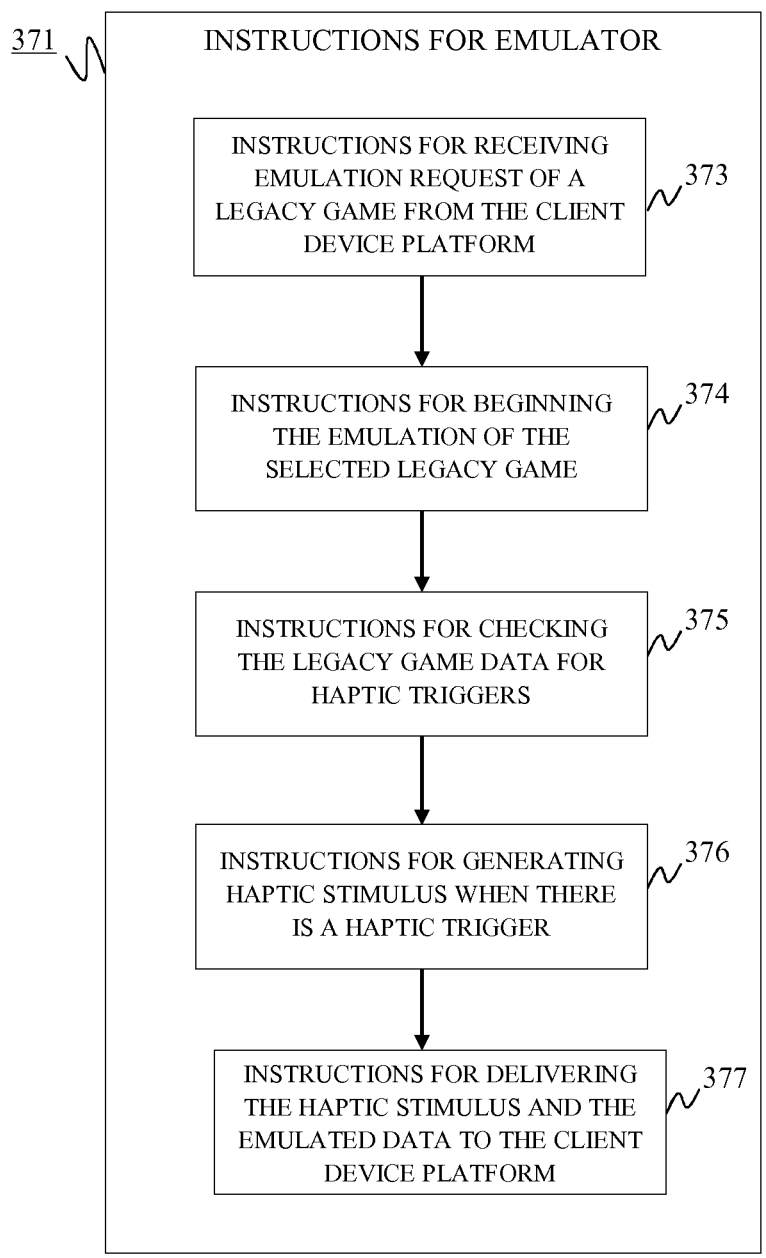
FIG. 3B is a block diagram describing the instructions for how an emulator adds haptics to an emulated game according to an aspect of the present disclosure.

As shown in FIG. 3B, a set of emulator instructions 371 may be implemented, e.g., by the emulator 107. The emulation instructions 371 may be formed on a nontransitory computer readable medium such as the memory 132' or the mass storage device 134'. The emulator instructions 371 may also be part of the process control program 133'. The instructions include receiving the title of a selected legacy game 106 from the client platform device 103 at 373. Thereafter the emulator 107 is instructed to begin emulating the selected legacy game 106 at 374. While emulating the legacy game 106, the emulator 107 is instructed to check for haptic triggers 110 at 375. Then at 376, if there are any haptic triggers 110 present, the emulator 107 is instructed to generate a haptic stimulus 111. The emulator 107 is then instructed to deliver the haptic stimulus 111 and the emulated legacy game data 109 to the client device platform at 377.

Figure 4:
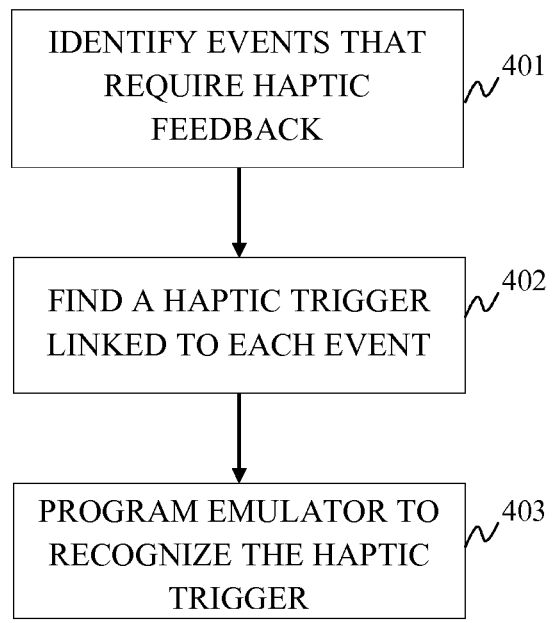
FIG. 4 is a flow diagram illustrating a method for programming the emulator to recognize haptic triggers according to an aspect of the present disclosure.

Emulator 107 may be programmed to recognize which portions of the legacy game data 109 are considered haptic triggers 110. FIG. 4 provides a flow diagram that describes a method 400 for programming the emulator to recognize that an event in the legacy game 106 requires a haptic response 146. First, at 401 a designer decides which events during the game should include a haptic response 146. By way of example and not by way of limitation, the designer may decide that the controller 145 should shake when there is an explosion on screen, the character being controlled by the user is injured, or the level is portrayed as a noisy environment. After determining which events should be accompanied with haptic feedback 146, the method proceeds to 402. There the designer must find haptic triggers 110 which coincide with the events. By way of example and without limitation the haptic triggers 110 may be sound card events, reading information from the disk, writing data to a memory card, or monitoring the memory contents of a legacy game 106 while the legacy game 106 is being emulated. Identifying haptic triggers 110 is further described in the previously incorporated commonly assigned related provisional patent application No. 61/666,628, entitled "DETERMINING TRIGGERS FOR CLOUD-BASED EMULATED GAMES", which has been incorporated herein by reference above. Once each event has been linked to a haptic trigger 110, method 400 continues at 403 by having the designer program the process control program 133' to recognize each haptic trigger 110 and generate a haptic stimulus 111 when the emulator 107 detects one.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In an emulator configured to operate on a network, a method for adding a haptic stimulus to an emulated program, wherein the haptic stimulus generates a haptic response, wherein the haptic response is feedback corresponding to the sense of touch, comprising:
   a) receiving an emulation request for emulation of a program, wherein the program is not originally configured to generate a haptic stimulus;
   b) determining if there is a haptic trigger within a set of emulated data derived from the program;
   c) generating a haptic stimulus when one or more haptic triggers are in the set of emulated data, wherein the haptic stimulus is configured to produce a haptic response when received by a client device platform; and
   d) delivering the haptic stimulus and the emulated data to the client device platform.

2. The method of claim 1, wherein having a specified sound played in the program is the haptic trigger.

3. The method of claim 1, wherein having a specified change in a memory used for the program is the haptic trigger.

4. The method of claim 1, wherein the set of emulated data derived from the game is produced by screen scraping the program.

5. The method of claim 4, wherein having a specified score displayed in the program is the haptic trigger.

6. The method of claim 4, wherein having a specified amount of time remaining in the program is the haptic trigger.

7. The method of claim 1, wherein the haptic trigger is a specified combination of two or more program conditions.

8. A nontransitory computer readable medium containing program instructions for adding a haptic stimulus to an emulated program, wherein the haptic stimulus generates a haptic response, wherein the haptic response is feedback corresponding to the sense of touch, and wherein execution of the program instructions by one or more processors of a computer system causes the one or more processors to carry out the steps of:
   a) receiving an emulation request for a program not originally configured to generate a haptic stimulus from a client device platform;
   b) determining if there is a haptic trigger within a set of emulated data derived from the program;
   c) generating a haptic stimulus when one or more haptic triggers are in the set of emulated data, wherein the haptic stimulus is configured to produce a haptic response when received by the client device platform; and
   d) delivering the haptic stimulus and the emulated data to the client device platform.

9. An emulator configured to operate on a network, comprising:
   a processor;
   a memory coupled to the processor;
   one or more instructions embodied in memory for execution by the processor, the instructions being configured to implement a method for adding a haptic stimulus to an emulated program, wherein the haptic stimulus generates a haptic response, wherein the haptic response is feedback corresponding to the sense of touch, the method comprising:
   a) receiving an emulation request for a program not originally configured to generate a haptic stimulus from a client device platform;
   b) determining if there is a haptic trigger within a set of emulated data derived from the program;
   c) generating a haptic stimulus when one or more haptic triggers are in the set of emulated data, wherein the haptic stimulus is configured to produce a haptic response when received by the client device platform; and
   d) delivering the haptic stimulus and the emulated data to the client device platform.

10. In a client device platform configured to operate on a network, a method for adding a haptic response to an emulated program, wherein the haptic response is feedback corresponding to the sense of touch, comprising:
    a) sending an emulation request to an emulator for emulation of a program, wherein the program is not originally configured to generate a haptic stimulus;
    b) receiving emulated program inputs and a haptic stimulus from the emulator, wherein the haptic stimulus is generated by the emulator; and
    c) using the haptic stimulus to generate a haptic response in the client device platform.

11. The method of claim 10, wherein the client device platform is a personal computer.

12. The method of claim 10, wherein the client device platform is a gaming console.

13. The method of claim 10, wherein the client device platform is a hand held gaming console.

14. The method of claim 10, wherein the client device platform includes one or more controllers.

15. The method of claim 14, wherein the haptic response is generated in at least one of the controllers.

16. A nontransitory computer readable medium containing program instructions for adding a haptic response to an emulated program, wherein the haptic response is feedback corresponding to the sense of touch, and wherein execution of the program instructions by one or more processors of a client device platform causes the one or more processors to carry out the steps of:
  a) sending an emulation request to an emulator for emulation of a program, wherein the program is not originally configured to generate a haptic stimulus;
  b) receiving emulated program data and a haptic stimulus from the emulator, wherein the haptic stimulus is generated by the emulator; and
  c) using the haptic stimulus to generate a haptic response in the client device platform.

17. A client device platform configured to operate on a network, comprising:
  a processor;
  a memory coupled to the processor;
  one or more instructions embodied in memory for execution by the processor, the instructions being configured to implement a method for adding a haptic response to an emulated program, wherein the haptic response is feedback corresponding to the sense of touch, the method comprising:
  a) sending an emulation request to an emulator for emulation of a program, wherein the program is not originally configured to generate a haptic stimulus;
  b) receiving emulated program data and a haptic stimulus from the emulator, wherein the haptic stimulus is generated by the emulator; and
  c) using the haptic stimulus to generate a haptic response in the client device platform.

* * * * *